United States Patent [19]

Hoffman

[11] 4,200,353

[45] * Apr. 29, 1980

[54] MODULATION CONTRAST MICROSCOPE WITH THREE REGIONS

[76] Inventor: Robert Hoffman, 17 Copper Beach Pl., Merrick, N.Y. 11566

[*] Notice: The portion of the term of this patent subsequent to Apr. 29, 1997, has been disclaimed.

[21] Appl. No.: 898,619

[22] Filed: Apr. 21, 1978

Related U.S. Application Data

[63] Continuation of Ser. No. 476,518, Jun. 5, 1974, abandoned.

[51] Int. Cl.² ............................................. G02B 21/14
[52] U.S. Cl. .................................................... 350/13
[58] Field of Search .................................. 350/12–15, 350/162 SF

[56] References Cited

U.S. PATENT DOCUMENTS

| | | | |
|---|---|---|---|
| 2,427,689 | 9/1947 | Osterberg et al. | 350/13 |
| 2,687,670 | 8/1954 | Locquin | 350/13 |
| 2,700,918 | 2/1955 | Osterberg et al. | 350/13 |
| 2,732,759 | 1/1956 | Osterberg | 350/13 |
| 2,950,648 | 8/1960 | Rhodes | 350/13 |
| 3,876,283 | 4/1975 | Judd | 350/87 |

Primary Examiner—Jon W. Henry
Attorney, Agent, or Firm—Arthur L. Plevy

[57] ABSTRACT

A modulation contrast microscope for rendering phase gradients in phase objects visible by virtue of creating light amplitude differences including a source aperture and a modulator having different density or color regions so that when a transparent object with phase gradients is examined the image exhibits viewable contrast effects.

20 Claims, 10 Drawing Figures

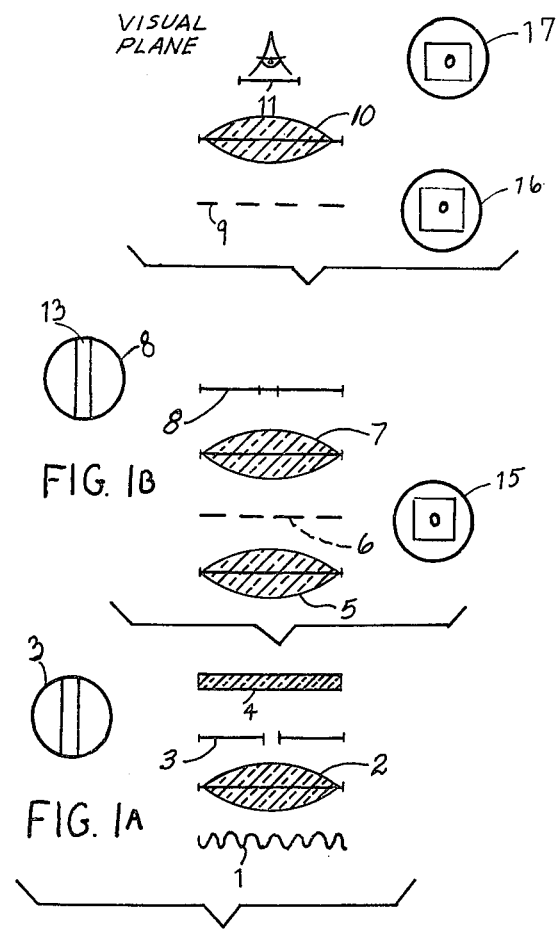
FIG. 1
FIG. 1B
FIG. 1A
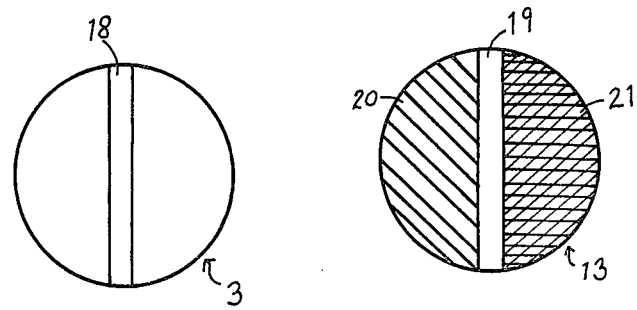
FIG. 2
FIG. 2A

MODULATION CONTRAST MICROSCOPE WITH THREE REGIONS

This is a continuation of application Ser. No. 476,518, filed June 5, 1974, now abandoned.

BACKGROUND OF THE INVENTION

1. FIELD OF THE INVENTION

This invention relates to a new and novel type of microscope, and more particularly to a microscope which renders phase gradients in phase objects visible by virtue of operating on portions of the amplitude of light passing through the Fourier plane, thus converting phase gradient information to intensity variations.

2. DESCRIPTION OF THE PRIOR ART

Objects examined under the microscope by either transmitted light or reflected light create an image by virtue of absorbing some of the light transmitted through or impinging upon the object. Such objects are known as amplitude objects. By virtue of the special characteristics of this invention, such amplitude objects are revealed more clearly, with greater detail and additional information which would not be visible. Other types of objects which are transparent or nearly transparent cannot be seen under the ordinary microscope with ordinary illumination, and are known as phase objects. Such objects retard or advance phase of the light wave passing through the object. Since the eye is sensitive to intensity and not to phase, such objects are invisible. Other microscope systems have been designed to convert phase changes into amplitudes or intensities, rendering the phase information in the object visible.

Existing microscopes which convert phase information into intensity differences, such as the phase microscope and the interference microscope, do so by interference effects which are produced in the image plane between two or more waves of light which have been split, separated by one means or another in the optical path of the microscope. The resultant interference between the waves of light passing through unchanged in phase and those which have been diffracted by the object produce intensity variations. In the phase contrast microscope, phase objects are rendered visible by the interference produced between the beams of light which pass through the object without deviation and the rays of light which have been deviated by the object. The phase difference introduced by the phase plate in the phase microscope is a design feature that renders visible small phase features of the object. Also, by virtue of the manner in which the phase plate is illuminated and constructed, a halo is produced around diffracting and refracting features of the object which obscures the boundaries of such features, rendering the phase microscope unsuitable for precise measurement of dimensions. The interference microscope, full duplication or differential type, produces interference at the image plane between two beams of light solely due to their phase difference.

SUMMARY OF THE INVENTION

The present invention overcomes the limitations of the phase contrast microscope and the interference microscope. Objects are rendered visible in a simpler manner, utilizing less expensive components. To accomplish this, the present invention, an apparatus for examining microscopic transparent objects, consists of a compound microscope wherein means are provided for illuminating the object with a controlled beam of light. Further means are included for selectively modulating the amplitude of portions of this beam after it has passed through the object. The beams subsequently combine to interfere in the image whereon phase gradients in the object are rendered visible.

One means for producing a controlled beam of illumination of the object is by a slit placed between the light source and the condenser in a plane conjugate to the Fourier transform plane after the objective. Then the condenser and objective of the microscope image the slit to create a Fourier transform plane after the objective. A neutral density light modulator is located at the Fourier transform plane in back of the objective such that the image of the illuminated slit falls on and is matched to a specific region of the modulator. In the absence of an object, all of the light passing through the microscope passes through this matching region. At either side of this specific region are two regions of different densities or optical transmittances such that the light passed by the modulator on one side of the image of the slit is of much greater intensity than on the other side of the image of the slit. Light passing through this novel modulator is distributed in the image plane of the microscope, selectively interferes, rendering phase gradients visible. The relative brightness of the gradient to the background intensity is the ratio of the distance the image of the slit is displaced to the width of the matched region of the modulator.

BRIEF DESCRIPTION OF THE DRAWINGS

FIG. 1 is a diagram in elevation of one embodiment of the optical elements shown schematically along the optical axis of the microscope;

FIGS. 1A to 1B are schematic diagrams of optical components of FIG. 1 shown in plan view;

FIG. 2 is a diagrammatic plan view of the optical slit below the condenser;

FIG. 2A is a diagramatic plan view of a modulator in the Fourier transform plane back of the objective;

DETAILED DESCRIPTION OF THE INVENTION

Figure 4:
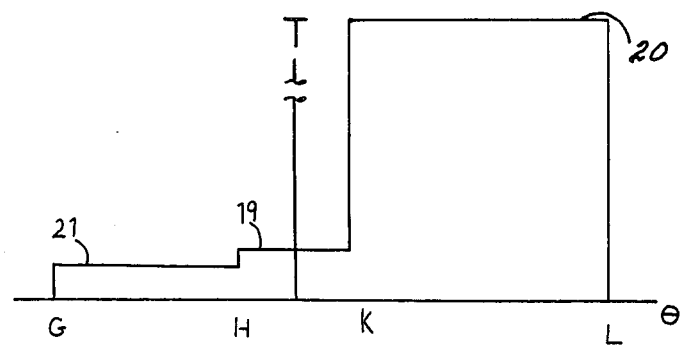
FIG. 4 is a graph showing the relative light transmittance qualities of one form of the modulator used in the invention.

With continuing reference to the accompanying drawings wherein like reference numerals designate parts throughout the various views, some of the conventional components of the ordinary compound microscope are used to attain the modulation contrast microscope according to the present invention. These conventional components include an illuminating lamp 1, a concentrating and focusing lens 2 for illumination from the lamp 1, a condenser lens 5, an object or specimen plane 6, the objective 7, the real image plane 9, and the ocular 10. The observer's eye is represented at 11.

The components of the present invention used in combination with the foregoing to attain the modulation contrast microscope include an aperture slit 3 and an optically plane glass plate or prism 4 both disposed between the lens 2 and the condenser lens 5. A most important component is the modulator 8 in the Fourier transform plane created by the image of the aperture. The modulator 8 maybe made of photographic film.

Light from the lamp falls upon an aperture, for example, a slit 3. The image of the slit is brought to a focus by both condenser and objective, creating the Fourier transform plane where the modulator 8 is located. For visualizing the operation of the invention, the images produced at all planes conjugate to the source aperture are shown in plan view at the left. A view of the specimen or object and its images produced in the subsequent conjugate planes is shown on the right. The aperture 3 passes a beam of light through the displacement control device, the optically plane glass plate or prism 4 which is spread by the condenser 5 to encompass the full field of the microscope where the specimen is placed in the object plane 6. The beam passes through the objective 7 which brings the image of the slit 3 into focus in the Fourier transform plane in back of the objective. The image of the slit is accurately registered upon the modulator 8 of this plane such that in the absence of an object all of the light from the slit passes through the central matching portion of the modulator. The specimen 15 in the object plane 6 is imaged by the objective and produces a real image 16 at the image plane 9 just before the ocular 10. The magnified image falls on the retina of the eye 11 or if recorded photographically, on the film of a camera. The optically plane glass plate 4 can be rotated or tilted about perpendicular to the optic axis. This motion will shift the image of the aperture with respect to the matching region 19 on the modulator 8, thus providing control over the extent of modulation contrast.

The essential elements of this invention comprise the insertion of an aperture 3, the location of which in the optical path of the microscope can be varied. This aperture or slit 3 can be one of a variety of shapes; however, for purposes of explaining the principles of operation, a rectangular slit 18, as illustrated in FIG. 2, is shown. Light passing through the slit passes the specimen 15 at 6, where it is brought to focus in the Fourier transform plane in back of the objective where the modulator 8, an essential element of this invention, is located. This modulator 8 is shown in FIG. 2A. Undeviated light rays which have not been affected by the object fall upon the central portion of this modulator 19, a region which absorbs some of the light passing through and transmits the remainder to continue onward to form background illumination and contribute to the image of the microscopic specimen. The beam displacement control device 4, an element of this invention, controls the registration of the image of the aperture on the central region 19 of the modulator 8. For purposes of this simplified explanation, each region of the modulator 8 has a uniform transmittance but may be fabricated with varying but controlled transmittance. In the regions 20, 21 on either side of the central portion of the modulator, the transmittance is different from that of the central portion 19. Region 20 has a transmittance very much greater than that of region 19, while region 21 has a transmittance less than that of region 19. A graph of the transmittance across a diameter of the modulator illustrates one of many possible fabrications with selected transmittances (FIG. 4).

When a specimen with phase gradients is in the objective plane 6, light is refracted out of the central region 19. Phase gradients are caused by refractive index differences and thickness differences. Consider that the object is a transparent, flattened disk such as a living cell. The cell differs in refractive index from the surrounding medium. The edge approximates a prism in shape. Light entering the bottom of the cell will be deflected towards the base of the prism and will, in effect, shift the image of the slit in the Fourier plane to one side. Similarly, light entering the other side of the cell will encounter what approximates a prism refracting light in the same manner to the other side. A gradient, or slope, can be viewed as a tiny prism. As a result of all of these refractions, there will be a deviation of light from the central region to either the less optically dense side of the modulator or the more optically dense side of the modulator. In the formation of the real image, the microscope optics combine light from all portions of the modulator, the resultant interference producing the contrast in the observed image. Light from refractive index gradients deviated in one direction has been transmitted at greater intensity than light from refractive index gradients deviated in the other direction. Such rays, when they meet at the image, will not cancel. A visible image will then result for phase objects.

The novelty of this invention is associated with the concept that the Fourier transform plane not only distributes the spatial frequencies of the object, but also distributes the maximum energy for each point on the gradient of an object.

Figures 3, 6:
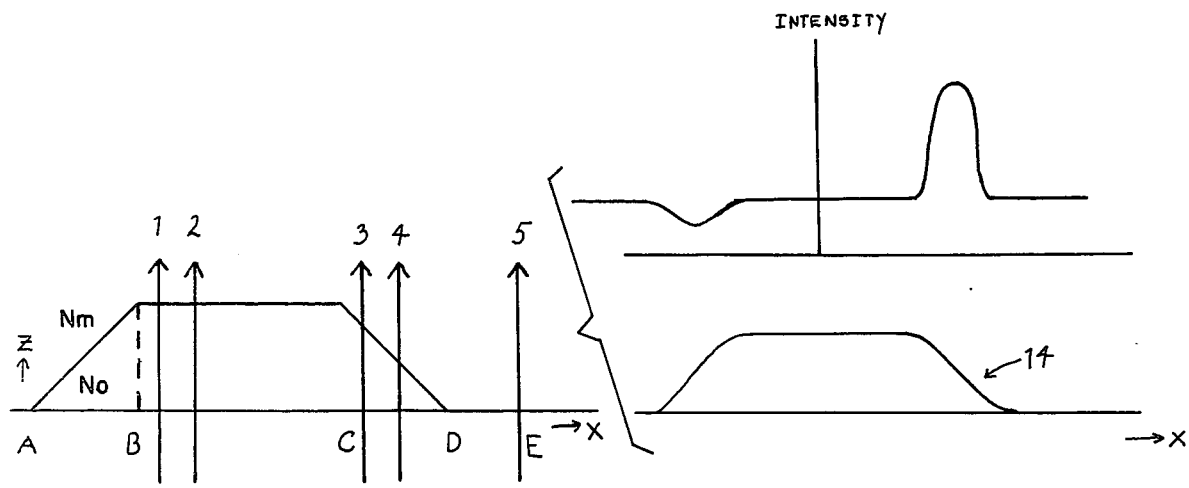
FIG. 3 is a schematic showing the method of operation and principles underlying the invention.
FIG. 6 is a view similar to FIG. 5, but showing an object of arcuately configurated portions as viewed.

An idealized phase object is shown in FIG. 3. The phase of ray 1 and 2 can be expressed as $e^{-i\delta}$ where $\delta$ is the phase difference with respect to a wave $5e^{-iK_oF}$ not passing through the object. The phase of ray 3 and 4 can be expressed as $e^{-i\phi x}$. Since $e^{-iKa3}$ is ray 3 and $e^{-iKa4}$ is ray 4 where $K=(N_o-N_m) K_a$ where $n_o$ is the refractive index of the phase object and $N_m$ is the refractive index of the outside medium, the slope of the edges of the object, $\tan\alpha$ is $\Delta z/\Delta X$ and as $\Delta X$ approaches zero, $\tan\alpha$ approaches $d\Delta/dX$, the slope or gradient for this illustration is related to $aby\ X\ \tan\alpha$ thus $\phi = k\ \tan\alpha$. Then at the Fourier transform plane considering only one lateral dimension, the amplitude 4(e) closely approximates a Fourier integral.

$$\sqcup(\theta) = \int_{-D/2}^{+D/2} e^{-i\phi x} e^{-i\theta x} dx$$

$$\sqcup(\theta) \approx \frac{D\sin[D/2(\theta - \phi)]}{[D/2(\theta - \phi)]}$$

$$\sqcup(\theta) \approx \frac{D\sin[D/2(\theta + \phi)]}{[D/2(\theta + \phi)]}$$

Maximum energy appears at the Fourier transform plane when $\theta \pm \phi = 0 = \theta'$ therefore, zero order (maximum amplitude cannot occur at $\theta = 0$ or the center of the image of the source when a phase gradient is present. $\theta$ is directly proportional to the phase gradient from the center and thus distributes the maximum energy of the source away from the center. This energy can be selectively absorbed by a transmittance transfer function at the Fourier plane in the form of a modulator. The modulator regions (FIG. 4) consist of a central narrow strip 19 and side regions 20, 21. The dimensions in the Fourier transform plane are, the densest region of the modulator, GH, 21, the central region, HK 19, and the less dense region KL 20 where H and K correspond to $\pm\theta\omega$; G and L the widest dimension of the modulator corresponds to $\pm\theta c$, the angle that represents the cut-off frequency of the transfer function of the optical system. In FIG. 4, the transmittance function T is selected (one of many possibilities) so that $$T\theta_\omega \text{ to } \theta_c >>> T \pm \theta_\omega > T - \theta_\omega \text{ to } -\theta_c$$

Figure 5:
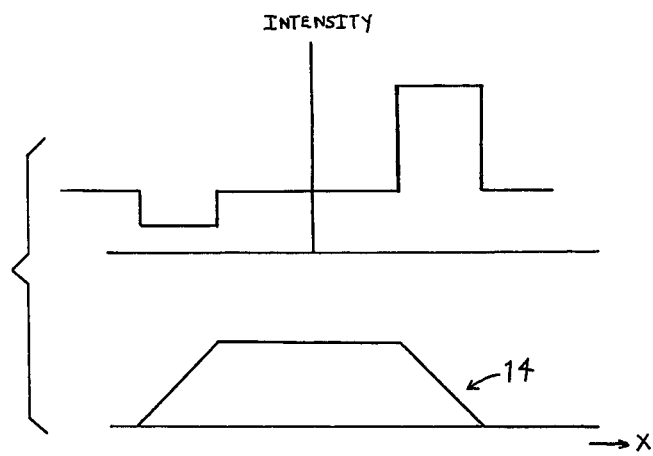
FIG. 5 is a representation of a trapezoidal shaped object being viewed and a graphical indication of its image through the microscope.

The intensity variation for the object of FIG. 3 is represented in FIG. 5, and for an object with rounded slopes in FIG. 6. The image intensity variations in the upper portion of FIGS. 5 and 6 represent modulation contrast of phase gradients.

The sensitivity of this method of rendering phase objects visible is dependent upon the width of the slit and the transmission ratio characteristics of the three sections of the modulator.

The relative transmissions of the different regions of the modulator can be selected to provide maximum contrast. Light passed by the central portion of the modulator becomes the background illumination in the image. A dark gray background furnishes maximum contrast for illuminated refractive index gradients. There must be a difference in intensities between the region of the modulator to either side of the central region. The central slit is chosen to have a transmittance that is quite low, providing a relatively dark gray background. Region 21 has approximately one-half the transmittance of the central region; the transmittance of the other region 20 is chosen close to 100%. The ratio between the transmission of regions 20, 21 is a measure of the modulation contrast possible. As the ratio increases, the contrast between two sides of small objects increases. An additional advantage of this choice of transmittance for regions 20, 21 is that a threedimensional image is observable. Another result of this choice of modulator transmittance is that the axial plane of interference in the image plane is exceptionally narrow, permitting what is known as optical sectioning to occur. In many respects, the appearance of the image in this type of microscope, modulation contrast, is similar to that produced by differential interference contrast microscope.

When the three or more regions of the modulator are of different colors, additional information about the object can be revealed in the image. Blue color is suggested for the central region 19 which will provide a blue background for those parts of the image not representing phase gradients. The eye is least sensitive to blue. The other colors will stand out more sharply, providing greater identification of gradients. Color selection for the other regions can be many; for this explanation, the colors chosen are red in region 21 and yellow in region 20. In the image plane, similar refractive index gradients will be colored alike. When the optically plane glass plate 4 is tilted with respect to the perpendicular to the optic axis, the image of the aperture 3 is shifted to one side or the other of the matching central region 19 of the modulator 8. This shift of the beam of light alters the background illumination which is now a mixture of rays from the central region and the region to which this image was shifted. The extent of modulation contrast has been reduced for slopes in the direction of shift and increased for slopes in the other direction. The eye can detect similar gradients more readily in color than with a neutral density type modulator; thus, color will more readily reveal similar structures. One marked advantage of this modulation contrast microscope is that the colored sections of the modulator can be chosen with different light transmittance, as described in previous paragraphs, with a neutral density modulator. Then, the three-dimensional effect is observed because the neutral density modulator is combined with a colored image. In this new microscope system, the modulation contrast microscope, color separation and neutral density transmission can be selected independently of each other and of the adjustment of the optics, and can be fitted to the nature of the object examined, a characteristic not found in interference or phase contrast microscopes.

When desired, the three different regions of the modulator can be fabricated to provide different changes of phase, somewhat similar to the phase plate in a phase contrast microscope, but markedly different in operation. However, the principle described in earlier paragraphs of different transmittance characteristics for the three regions of the modulator will produce an image similar to phase contrast but without the artifact of the halo. In fact, the modulation contrast technique reveals that halo production is due to phase gradients which are clearly revealed in the modulation contrast microscope. Phase gradients cause halo and obscure information in the phase contrast microscope.

Figure 7:
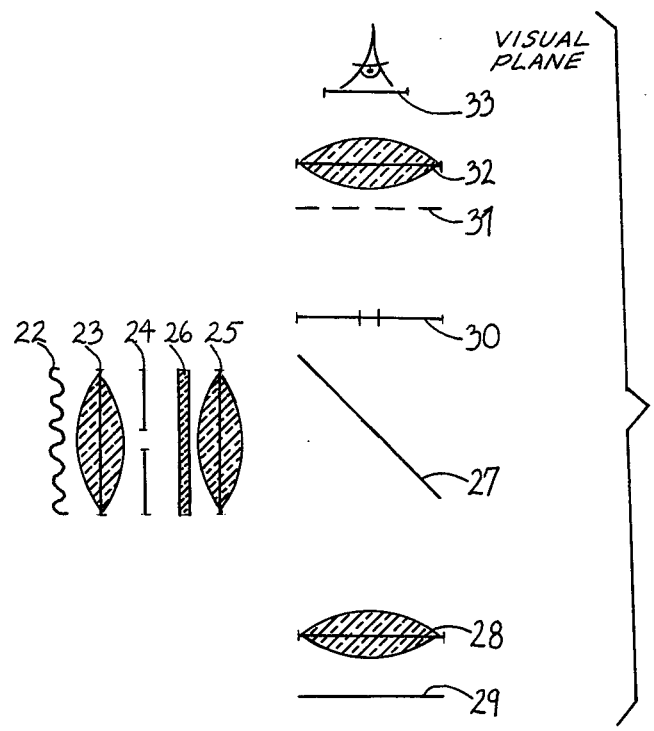
FIG. 7 is a schematic diagram of another form of the invention for observing opaque objects by reflection.

The modulation contrast principle can be applied to a microscope system for reflected light, as shown in FIG. 7. The optics used are the same as for a compound microscope utilizing epi illumination. The light from source 22 is gathered by a lens 23 and focused on the slit 24 and passes through the beam displacement control 26. The condenser 25 throws the light on a beam splitter 27, directing a beam through the objective 28 onto an opaque object 29. The light reflected by the opaque object passes through the objective to the Fourier transform plane 30 where the modulator is located. The light rays pass through the modulator to the image plane 31 which is magnified by the ocular 32 and imaged in the eye 33. The same latitude of modifications are available for the reflected microscope as those described for the transmitted light microscope.

I claim:

1. A modulation contrast microscope comprising means for supporting an object at an object position, means for providing a beam of rays of light for illuminating the object, condenser means for concentrating the beam on the object position, an objective focused on the object position for receiving the beam after it has left the object, means for viewing the image, an aperture placed below said condenser means in a plane conjugate to the Fourier transform plane in back of the objective, and a modulator having different density regions located at the Fourier transform plane behind the objective, said modulator consisting essentially of three regions, a substantial first specific density region with said first region positioned in the transform plane on said modulator such that the light intensity may be modified relatively about said first region in both a greater and lesser intensity, a second substantial immediately adjacent region of a substantially different density adjacent to and bounding said first region to the right and a third region of a substantially different density than either said first or second regions adjacent to and bounding said first region to the left, said three regions occupying essentially the entire transform plane, whereby there is an abrupt change in density between said adjacent regions, manifesting a stepped density function along one axis of the modulator with the image of said aperture being registered on said first specific density region, whereby when a transparent object with phase gradients is examined, the image exhibits viewable contrast effects corresponding to the portions of the object's phase gradients resulting from modifications by the modulator of the amplitude of the light beams transmitted through it and relatively about said first region in both a greater and lesser intensity, with said image of said object appearing three dimensional.

2. A microscope in accordance with claim 1, including an aperture located below the object, said modulator being located at the conjugate plane to the aperture, after the object.

3. A microscope in accordance with claim 1, wherein said modulator has regions having both density differences and color differences.

4. A microscope in accordance with claim 1 further including a beam displacement control means for controlling the registration of the image of said aperture on said modulator.

5. A microscope in accordance with claim 1, wherein said modulator is composed of at least one or more regions of polarizing material.

6. A microscope in accordance with claim 1, wherein phase altering materials can be used in the different regions of said modulator to effect the interference at the image plane without halos.

7. A microscope in accordance with claim 1 where said first region is relatively central and of a grey transmittance and said transmittance of said second region is clear and said third region of said modulator is black, thus modulating the amplitude transmittance.

8. A microscope in accordance with claim 1, wherein said aperture is a rectangular slit relatively conforming to said first specific density region.

9. A microscope in accordance with claim 1, wherein the transmittance of one of said regions is varied to control the intensity of the background of the image.

10. A microscope in accordance with claim 1 further including means for rotating said aperture, as well as said modulator so that the direction of the refractive index gradient may be detected.

11. A microscope in accordance with claim 1 further including means for varying the position of the aperture along the optic axis so as to create a Fourier transform plane at a selected location different from the back focal plane of the objective.

12. A microscope in accordance with claim 1, wherein said modulator has a high amplitude transmittance for positive gradients in the object and a low amplitude transmittance for negative gradients of the object resulting in a three-dimensional image of phase objects.

13. A microscope in accordance with claim 1, wherein optically plane glass is pivotally and tiltably placed between the aperture and the condenser for providing variable modulation contrast by controlling the extent of registration of the image of the aperture on the corresponding region of the modulator in the conjugate Fourier plane.

14. A microscope comprising means for supporting an object at an object position, means for providing rays of light for illuminating the object, condenser means for concentrating said rays of light, an objective focused on the object position for receiving said rays after leaving the object, means for displaying an image, an illumination source positioned in a first plane conjugate to a Fourier transform plane, and modulation contrast means positioned at said Fourier transform plane consisting of essentially three regions having a first substantial specific density region, with said first region positioned in the transform plane on said modulation contrast means such that the light intensity may be modified relatively about said first region in both a greater and lesser intensity, a second substantial immediately adjacent region to the right of said first region of a substantially different density and a third substantial immediately adjacent region to the left of said first region and of a substantially different density than said first or second regions, with said three regions occupying essentially said entire transform plane, whereby there is an abrupt change in density between said adjacent regions manifesting a stepped density function along one axis of said modulation contrast means, with the image of said illumination source being registered on said first region causing modifications by said means of the amplitude of said light rays relatively about said first region located on said means in both a greater and lesser intensity, whereby when a transparent object with phase gradients is examined, said means for displaying an image provides a display of said object with viewable contrast effects, with said image of said object appearing three dimensional.

15. An optical system particularly adapted for viewing a phase object, comprising:
   (a) first means for illuminating said phase object,
   (b) a lens assembly for focusing illumination leaving said object at a predetermined plane,
   (c) a first aperture located between said means for illuminating said object and said predetermined plane, said aperture located in a plane conjugate to a second plane characterized in that spatial frequencies of the object and relatively maximum energy for each point on the gradient of the object are distributed, said second plane defining a Fourier transform plane, and
   (d) modulation means consisting esentially of three regions located at said second plane for selectively adsorbing energy according to said gradient of said object to enable a user to view said phase object with viewable contrast effects and appearing three dimensional due to the operation of said modulation means, said modulation means operating to adsorb energy about a substantial central region in both a greater and lesser intensity, said modulation means having a second substantial region immediately adjacent and to the right of said central region and of a substantially different density and a third region immediately adjacent to and to the left of said central region and of a substantially different density than said second and central regions, with said three regions occupying essentially the entire transform plane, manifesting a stepped density function along one axis of said modulation means, with the image of said aperture being registered at said central region.

16. In a microscope of the type employing means for supporting an object at an object position, means for providing a beam of rays of light for illuminating the object, a condenser means for concentrating the beam, an objective focused on the object position for receiving the beam after it has left the object and an image plane for viewing or displaying the object, the improvement therewith of apparatus for displaying a phase object, comprising:

(a) an arbitrary aperture positioned at a predetermined plane and located to intercept said beam, said plane defining a conjugate plane designated as a Fourier plane at which both the spatial frequencies of the object and maximum energy for each point on the gradient of the object can be distributed, and (b) modulation contrast means consisting essentially of three regions located at said conjugate plane for distributing light passing therethrough at said image plane, said means exhibiting three distinct transmittance regions capable of converting phase gradients to viewable contrast information, said regions including a first substantial specific density region with said first region positioned in the transform plane on said modulation contrast means such that the light intensity may be modified relatively about said first region in both a greater and lesser intensity, a second substantial immediately adjacent region to the right of said first region of a substantially different density and a third substantial immediately adjacent region to the left of said first region of a substantially different density than said first or second regions, whereby there is an abrupt change in density between said adjacent regions manifesting a stepped density function along the axis of said modulation contrast means, with the image of said aperture being registered at said first region, whereby a phase object can be viewed or displayed in three dimensional appearance, said transmittance regions characterized in that said three regions occupy essentially the entire conjugate plane.

17. An optical system particularly adapted for use in microscopy and useful for viewing phase objects with the aid of a light beam, comprising:

(a) a predetermined plane located in a given optical path after said object, said predetermined plane positioned in said optical path so that both the spatial frequencies of the object and maximum energy for each point on the gradient of the object can be distributed, (b) modulation contrast means having different density regions located at said predetermined plane, said means consisting essentially of three regions having a first substantial specific density region with said first region positioned in said plane on said modulation contrast means such that the light intensity may be modified relatively about said first region in both a greater and lesser intensity, a second substantial immediately adjacent region of a substantially different density and to the right of said first region, a third substantial immediately adjacent region of a substantially different density than either said first or second and to the left of said first region, wherein said three regions occupy essentially the entire predetermined plane, whereby there is an abrupt change in density between said adjacent regions manifesting a stepped density function along one axis of said modulation contrast means, causing modifications by said means of the amplitude of said light beam relatively about said first region in both a greater and lesser intensity, and (c) an illumination source positioned in a plane conjugate to said predetermined plane for illuminating said object, with the image of said illumination source registered at said first region to cause one to view said object above said modulation means with a three dimensional appearance.

18. A modulation contrast microscope comprising means for supporting an object at an object position, means for providing a beam of rays of light for illuminating the object, condenser means for concentrating the beam on the object position, an objective focused on the object position for receiving the beam after it has left the object, means for viewing the image, an aperture placed below said condenser means, a modulator in back of the objective having different transmittance regions positioned at a predetermined plane in said optical path of said microscope, said plane designated as a Fourier transform plane and characterized in that both the spatial frequencies of the object and maximum energy for each point on the gradient of the object can be distributed, said modulator consisting essentially of three regions and having a transmittance in one main region which is substantially different from the transmittance of the rest of the modulator with said one main region positioned in said plane and on said modulator such that the light intensity may be modified relatively about said main region on both a greater and lesser intensity, a second region to the right and adjacent to said main region of a substantially different density and a third region to the left and adjacent to said main region and of a substantially different density than said main or second regions, with said three regions occupying essentially the entire transform plane, with the transmittance of the modulator manifesting a stepped density function along one axis of said modulator with the image of said aperture registered at said one main region such that the energy due to phase gradients of said object is modified about said main region in a greater and lesser intensity and mainly along said axis to enable identification of all parts of an object having phase gradients with the image of said object appearing three dimensional at said image plane.

19. A modulation contrast microscope comprising means for supporting an object at an object position, means for providing a beam of rays of light for illuminating the object, condenser means for concentrating the beam on the object position, an objective focused on the object position for receiving the beam after it has left the object, means for viewing the image, an aperture placed below said condenser means in a plane conjugate to the Fourier transform plane in back of the objective, and a modulator having different density regions located at the Fourier transform plane behind the objective, said modualtor consisting essentially of three regions, a first substantial specific density region with said first region positioned in said transform plane on said modulator such that the light intensity may be modified relatively about said first region in both a greater and lesser intensity, a second substantial immediately adjacent region of a substantially different density to the right of said first region, and a third substantial immediately adjacent region of a substantially different density than said first or second regions and to the left of said first region, with said three regions occupying essentially the entire transform plane, whereby there is an abrupt change in density between said adjacent regions manifesting a stepped density function along one axis of said modulator, with the image of said aperture registered at said first region, whereby when a transparent object with phase gradients is examined, the image exhibits viewable contrast effects corresponding to the portions of the object's phase gradients resulting from modifications by the modulator of the amplitude of the light beams transmitted through it and relatively about said first region in both a greater and lesser intensity to cause said image to appear three dimensional at said means for viewing said image.

20. A modulation contrast microscope comprising means for supporting an object at an object position, means for providing a beam of rays of light for illuminating the object, condenser means for concentrating the beam on the object position, an objective focused on the object position for receiving the beam first it has left the object, means for viewing the image, an aperture placed below said condenser means in a plane conjugate to the Fourier transform plane in back of the objective and a modulator having different density regions located at the Fourier plane behind the objective, said modulator consisting essentially of three regions and having a first specific density region of a finite width of substantially uniform density, said first region located in said plane and bounded on one side by a second adjacent region of a substantial different uniform density and on the other side by a third adjacent region of a uniform density completely different than that of said first and second regions, said three regions occupying essentially the entire transform plane with said image of said aperture registered on said first central region such that the light intensity may be modified about said first region in both a greater and lesser intensity whereby when a transparent object with phase gradients is viewed, the image exhibits viewable contrast effects corresponding to the portion of the object's phase gradients resulting from modification by the modulator of the amplitude of light beams transmitted through it and relatively about said first region in both a greater and lesser intensity, with said image of said object appearing three dimensional.

* * * * *